United States Patent [19]

Trehn et al.

[11] Patent Number: 4,460,965
[45] Date of Patent: Jul. 17, 1984

[54] DEVICE FOR THE USE OF AND EASILY CARRIED BY AN INDIVIDUAL

[76] Inventors: Karl B. Trehn, Lillgården, Överby, 150 12 Stjärnhov; Nils H. Swahn, Granevägen 8, 182 65 Djursholm, both of Sweden

[21] Appl. No.: 232,223

[22] Filed: Feb. 6, 1981

[30] Foreign Application Priority Data

Mar. 2, 1979 [SE] Sweden ............... 7901889

[51] Int. Cl.³ .................. G06F 15/30; G07C 1/30
[52] U.S. Cl. ..................... 364/464; 364/408; 364/401; 364/406; 377/26; 368/90; 235/379
[58] Field of Search ......... 364/408, 403, 404, 405, 364/406, 709, 464–467, 401; 235/92 TC, 92 AC, 379; 133/4 R; 368/90; 377/20, 26

[56] References Cited

U.S. PATENT DOCUMENTS

| | | | |
|---|---|---|---|
| 3,815,718 | 6/1974 | Singer | 235/92 TC X |
| 3,867,615 | 2/1975 | Sioufi | 235/92 TC |
| 3,959,632 | 5/1976 | Trehn et al. | 235/92 TC X |
| 4,065,663 | 12/1977 | Edwards | 364/464 |
| 4,075,696 | 2/1978 | Shinoda et al. | 364/709 X |
| 4,133,034 | 1/1979 | Etter | 364/464 |
| 4,134,537 | 6/1979 | Glaser et al. | 235/379 |
| 4,151,596 | 4/1979 | Howells | 364/709 |
| 4,164,038 | 8/1979 | Nachtigal | 235/92 AC X |
| 4,188,962 | 2/1980 | Onoe et al. | 133/4 R |
| 4,192,006 | 3/1980 | Hausdorff | 364/464 X |
| 4,233,660 | 11/1980 | Fagan | 364/464 X |
| 4,277,837 | 7/1981 | Stuckert | 364/408 X |
| 4,310,890 | 1/1982 | Trehn et al. | 364/464 |
| 4,321,671 | 3/1982 | Ohsako | 364/405 |
| 4,341,951 | 7/1982 | Benton | 364/406 X |

Primary Examiner—Edward J. Wise
Attorney, Agent, or Firm—Burns, Doane, Swecker & Mathis

[57] ABSTRACT

A device for the use of and easily portable by an individual, consisting of a main memory, a microprocessor, a keyboard for the control of the microprocessor, etc., and at least one accounting memory and a display. Operation of the keyboard in a pre-determined fashion will cause the microprocessor to transfer one or more units of information from the main memory to at least one accounting memory. The point in time at which this transfer is made directly or indirectly (for example via internal delay circuits) may be determined by the individual. The number of information units to be transferred is determined by operating the keyboard in a certain, preferably combinatory fashion. Each information unit or group of units which is transferred from the main memory to the accounting memory by operating the keyboard in some other, certain, preferably combinatory fashion will either be given a certain address code or will be allocated to a specific accounting memory.

7 Claims, 6 Drawing Figures

DEVICE FOR THE USE OF AND EASILY CARRIED BY AN INDIVIDUAL

TECHNICAL FIELD

The present invention relates to an easily portable device, said device being capable of being in the possession of an individual. The device may either be personal, or else intended for use in conjunction with a specific object forming part of a system. The specific object may be a car, a department store, a building used as a car park or a stretch of road subject to a toll. The device may be used for every kind of financial transaction.

The device disclosed in accordance with the present invention consists of a main memory, a microprocessor, a keyboard for the control of the microprocessor, etc., and at least one accounting memory. A readout of the information which is stored in the accounting memory may be obtained via a terminal. The terminal may also be used for the input into the main memory of a certain quantity of information units, said quantity representing a fee which has been paid in an advance sales system. A fee which has been paid shall be understood to indicate both cash payments and payments made by credit card, or else by the direct or indirect debiting of a bank or similar account, preferably the holder's own account.

The aim of the device in accordance with the present invention is that it should be capable of being used as a means of payment, so that the person in charge of the device at the actual moment of payment shall not be required to have cash on his person. Nor does the device require coins of low value to be given in the form of change. The device may be used as a means of payment in accordance with either the advance payment principle or the credit principle.

In the event of the device being used in conjunction with a system based on advance payments, then the device shall be programmed with a number of information units held in the main memory via terminals which have been determined beforehand in relation to the size of the purchase. One or more of these information units in the main memory may be transferred to one or more of the accounting memories by the payer and/or by the person in charge of the device at the moment of each transaction or payment. As a rule, a financial transaction will be transferred to one accounting memory, with other types of transaction being transferred to the same or a different accounting memory, etc. However there is nothing to prevent a financial transaction causing information units to be transferred in equal or unequal proportions to two or more accounting memories.

In the event of the device being used in conjunction with a system based on credit, either an arbitrary or a pre-determined number of information units shall be accessible in the main memory, said information units being transferred by the person in charge of the device via a keyboard to at least one accounting memory.

Where the device is to be used in conjunction with a system based on an authorized credit limit, then the main memory may be dimensioned to accept a certain (maximum) number of information units which the payer is free to use at will and which, depending on a code which is entered via the keyboard, may be transferred to an accounting memory containing the corresponding code. Alternatively, one or more of the accounting memories may incorporate a blocking function which is activated as soon as the number of information units in storage exceeds a pre-determined value. It is also possible to introduce a blocking device, both in the main memory and in the accounting memories, which will prevent an individual financial transaction or the sum of a number of transactions (within a specified period) from exceeding a pre-determined value.

The invention is based on the principle that each information unit shall be allocated an address code by the person operating the keyboard, so that it will be transferred to the correct accounting memory. Alternatively, both the address and the number of information units for each transaction may be stored in a single accounting memory. It is also possible to allow the address code for the first transaction to identify one of the accounting memories, after which all subsequent transactions with the same address code will be stored in that memory without an address code.

After it has been used, a read-out from the device shall be entered into a terminal which will either analyse the number of information units which have been transferred to each accounting memory, or analyse each transaction which has been performed by the device.

Although the present invention as described above may be used in all types of financial transaction, the following is intended to be a description of a typical practical application of the subject matter of invention on the assumption that the easily portable device is being used in conjunction with a parking system specifically intended for motor vehicles.

DESCRIPTION OF THE PRIOR ART

Already disclosed in Swedish Patent Specification No. 380 115 is a system for use in connection with the purchase of services, for example when using a car park, consisting of a device for storing the service fee which has been paid and which may be used by the payer, together with an apparatus, or terminal, which may not be used by the payer and which feeds details relating to the size of the purchase into the storage device.

The most significant feature of this device is the fact that the terminal which may not be used by the payer is equipped with instruments which are capable of identifying every service fee storage device belonging to the system. This apparatus consists of a de-coder which, depending on the information received from the terminal, will transmit significant information back to the terminal, said information activating an internal circuit within the terminal in the form of a de-coder which then re-transmits significant information back to the service fee storage device which, after it has analyzed this significant information, will enter details of the size of the purchase into the storage apparatus incorporated in the device.

Also previously disclosed is an embodiment of a parking meter with a coin slot, said meter being permanently located adjacent to a pre-determined number of parking spaces. This parking meter is fitted with electronic circuits which will determine whether a parking space is available and which will calculate the permitted period of parking in relation to the sum which has been paid. The parking meter is so designed that its calculating and control functions are provided by a microprocessor controlled by a memory with a fixed programme in store. There is, of course, also a random access memory containing information stored on a temporary basis which has been added to the information entered by the payer via the selector switch situated on the parking meter.

These parking meters are usually erected in such a way that each parking meter covering a number of parking spaces is allocated to an owner, with all the income from that meter accruing to the owner.

It is also usual for payment to be demanded at the same time as the parking space is being used, which means that the user of the parking space must have coins available to insert into a coin slot.

DESCRIPTION OF THE PRESENT INVENTION

TECHNICAL PROBLEM

The problem of making the financial transaction without the use of cash has existed for a long time in the case of many financial transactions, and also when using the device which is the subject of the present invention in conjunction with a parking system specifically intended for motor vehicles. The main problem is concerned with making a reliable financial transaction in which the payee is precisely identified. It is a problem to produce a device which is able on the one hand to store details of the size of the financial transaction and on the other hand information in respect of the identity of the recipient of the payment and, at the same time, in respect of the payer.

Where the device is used in conjunction with a parking system, there is a marked requirement to be able to divide up the income from the various parking meters with different owners and with varying frequency of parking amongst the various recipients.

A problem has also been encountered, where consideration must be given to the requirement for the complex division of income referred to above, in designing a device of which the external dimensions are such that it may still be used by the individual and easily carried by him, preferably in the form of a pocket-book.

SOLUTION

The present invention is able to solve the problems referred to above by means of a device to be used by the payer and easily carried by him, consisting of a main memory, a microprocessor, a keyboard for the control of the microporcessor, etc., and at least one accounting memory, so designed that the operation of the keyboard in a pre-determined fashion will cause the microprocessor to transfer one or more units of information complete with address code from the main memory to at least one accounting memory.

An essential feature of the present invention and of the solution of the problems referred to above may also be found in the fact that the point in time at which a transfer is made directly or indirectly (for example via internal delay circuits) may be determined by the payer.

Furthermore, the number of information units to be transferred from the main memory to at least one accounting memory is determined by operating the keyboard in a certain, preferably combinatory fashion. A display is also incorporated.

Each information unit or group of such units which is transferred from the main memory to the accounting memory by operating the keyboard in some other, certain, preferably combinatory fashion will either be given a certain address code or will be allocated on the basis of an address code to an accounting memory determined by that code.

ADVANTAGES

A device for the use of and easily carried by an individual in accordance with the present invention may, as has been indicated above, be used either in conjunction with a system based on advance payments or in conjunction with a system based on credit. What is important, however, is that each unit of information stored in the main memory must, at the moment at which it is removed from the main memory and transferred to an accounting memory, be allocated by means of a code either to a specific accounting memory or to an associated address code, in order that on the subsequent read-out of the contents of the accounting memories it may be established how many units of information belong to the first recipient or principal, how many units of information belong to the second principal, and so on.

Other important advantages are associated with the fact that the units of information in the main memory all have the same value (for example, all may represent the value of one Swedish krona), thus facilitating the entry of units of information into the main memory at the same time as the retrieval of units of information from the accounting memories is made easier.

Both the main memory and the accounting memory may be in the form of simple counters.

Every transaction may be conducted straightforwardly via the keyboard, since the time of transaction, the quantity of information units and the address marking (address codes) are all determined by the individual.

The value of all the units of information contained in the main memory may be pre-determined, if so desired.

The value of the units of information contained in each accounting memory may be determined either beforehand or subsequently.

What may be regarded as the characteristic features of a device for the use of and easily carried by an individual in accordance with the present invention are indicated in the first paragraph of the following patent claim.

DESCRIPTION OF THE DRAWINGS

A proposed embodiment exhibiting the significant characteristic features of the present invention is described below in greater detail with reference to the attached drawing, in which the invention is illustrated in relation to a parking system specifically intended for motor vehicles.

DESCRIPTION OF THE PREFERRED EMBODIMENT

The present invention may thus be used in connection with all kinds of financial transaction, but is exemplified below with the device forming part of a parkinhg system of a kind which is intended for motor vehicles.

Figure 1:
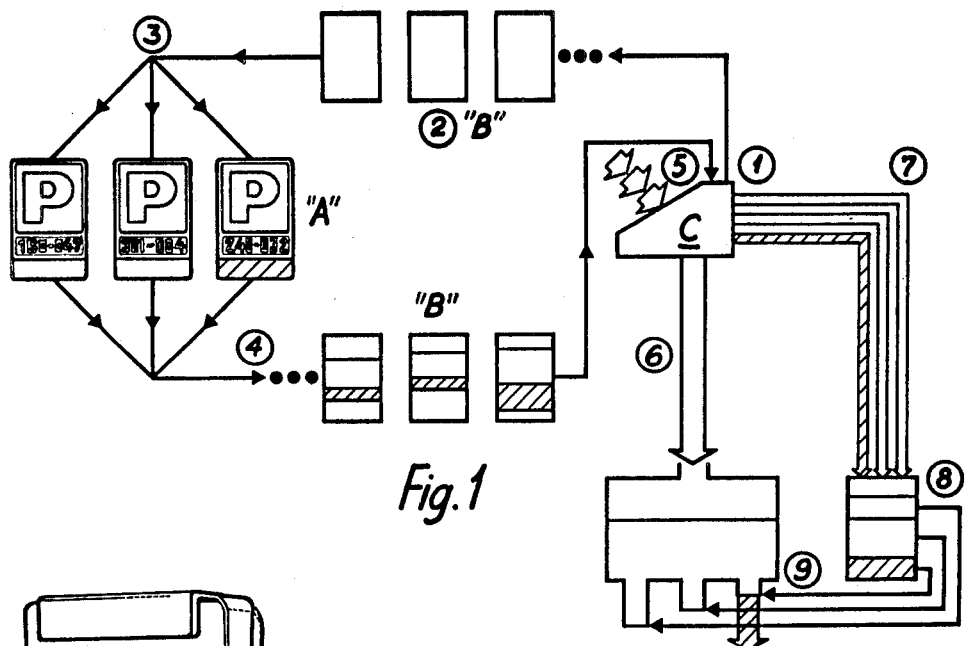
FIG. 1 shows how the three component parts which go to make up the parking system operate in conjunction with each other and how this enables smooth cash flow and straightforward accounting to be achieved.

As may be seen from FIG. 1, the parking system utilizes three component parts which are physically separate from each other but which operate in conjunction with each other, and which are:

("A") a sign with a significant tariff number allocated to the parking space;

("B") a device in accordance with the present invention belonging to the vehicle and/or for use by the owner of the vehicle;

("C") a terminal in which the information stored in the device may be analysed.

The parking space to which the sign "A" is allocated is provided wih a piece of information (a tariff number) which in coded form is intended at least to furnish details of one of the following criteria (i) the duration of the maximum parking period;

(ii) the cost per unit of time or per occasion; and (iii) the person or persons who are entitled to receive payment for the time used or for the occasion on which parking took place.

So that the aforementioned requirements may be met, it is essential that the device belonging to the vehicle and/or for use by the owner of the vehicle should be designed so as to incorporate an arrangement whereby the information which appears on the sign may be assimilated, the code may be analysed and the criteria represented by the code may be distinguished. It is also essential that said device should be capable of storing the information acquired when the vehicle is parked, and also that a terminal should be so arranged that it is capable of analysing and distinguishing the information stored in the device and acquired on a number of occasions on which vehicles were parked.

FIG. 1 illustrates the component parts which operate in conjunction with each other, i.e. the parking space with the sign "A" allocated to that parking space, a device "B" belonging to the vehicle and/or for use by the owner of the vehicle, and a terminal "C".

In accordance with the present invention, the information which appears on the sign shall be in the form of a number of figures, whereby a single figure or group of figures shall indicate in coded form the duration of the maximum parking period, a different figure or group of figures shall indicate in coded form the cost per unit of time or per occasion on which a vehicle is parked, with yet other different figures indicating in coded form the person or persons who are entitled to receive payment for the time used or for the occasion on which parking took place.

Figure 2:
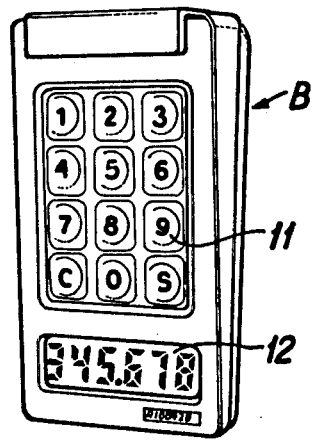
FIG. 2 shows in perspective view a device in accordance with the present invention belonging to the vehicle and/or for use by the owner of the vehicle.

The device "B" belonging to the vehicle and/or for use by the owner of the vehicle illustrated in FIG. 2 consists of a keyboard via which the information shown on the sign may be entered in digital form, plus a digital display which shows the sign and the information which has been entered.

The device in accordance with the present invention consists of a main memory into which are entered a number of units of information. Where the device is used in conjunction with a system based on advance payments, these units of information correspond to a sepcific sum which has been paid. In addition, the device also incorporates one or more accounting memories, to which units of information are transferred from the main memory when the vehicle is parked, in relation to the information which has been entered on the basis of the information read from the sign and in relation to the effect of an internal electronic elapsed-time recorder within the device in conjunction with a microprocessor and its associated electronic circuitry.

The reference 1 is used in FIG. 1 to indicate that the meter "B" in a system based on advance payments has been programmed via the terminal "C" with a number of units of information representing a pre-determined fee. In a system in which no advance payments are made, one may wish to consider limiting the number of units of information which may be entered into the main memory. Alternatively, one may wish to consider restricting the storage capacity of the accounting memories. The reference 2 is used to show that three separate devices have had their main memories programmed with units of information, known also as markers, but that all the accounting memories have been reset to zero.

The reference 3 assumes that the driver is parking the motor vehicle and that he is entering into his meter the information which relates to that parking space or the so-called tariff number. Accordingly, markers will be transferred during the parking period from the main memory of the device and to the accounting memory appropriate to the principal who is entitled to receive payment for the use of that particular parking space. The reference 4 is used to show that the accounting memories of the different meters have been filled to varying levels with units of information from the main memory.

The reference 5 is used to show that the device may be re-programmed via the terminal "C" once the markers in the main memory begin to run out.

The reference 6 illustrates that payment in respect of used markers is accounted for directly in a special account.

The reference 7 illustrates that the nature of the terminal is such that it will reset all the accounting memories of the meter to zero and that the information thus obtained will be transferred for data processing. This data processing 8 enables the markers provided by the motorist to be transferred to the appropriate principal. This transfer is identified by the reference 9.

FIG. 2 shows a perspective view of a device "B", from which it may be seen that the data obtained from the information which appears on the sign may be entered via a keyboard 11. A digital display 12, which shows the information which appears on the sign, will now indicate the number which has been entered.

It is important that the meter should be capable of being positioned at a specific point behind the windscreen, thus making it possible to check that charging is actually taking place, i.e. the number which is entered must be visible.

Figure 3:
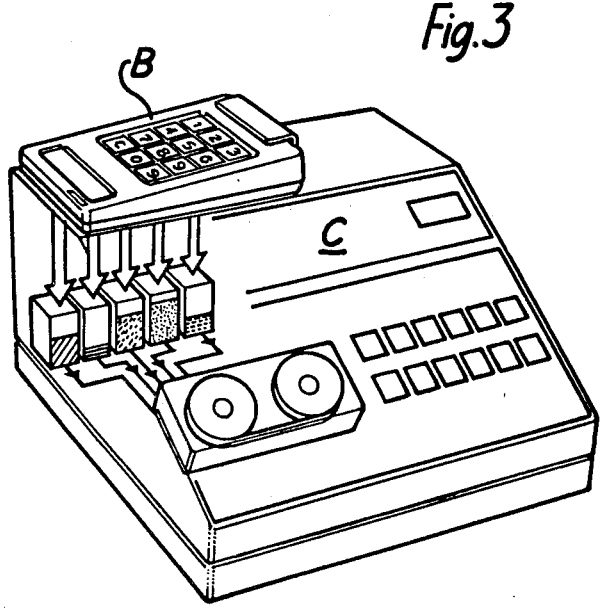
FIG. 3 shows an envisaged relationship between a device in accordance with the present invention and a terminal.

FIG. 3 illustrates how a device "B" is placed on a terminal "C" and how the terminal will analyse the contents of all the accounting memories and how the terminal will in fact distinguish between the contents of those memories so that it will then be able to initiate the subsequent distribution of the income from the meters. The intention is that the device "B" should be placed on a special plate on the terminal "C" and that the transfer of the signal between the meter and the terminal should take place optically.

Figure 4:
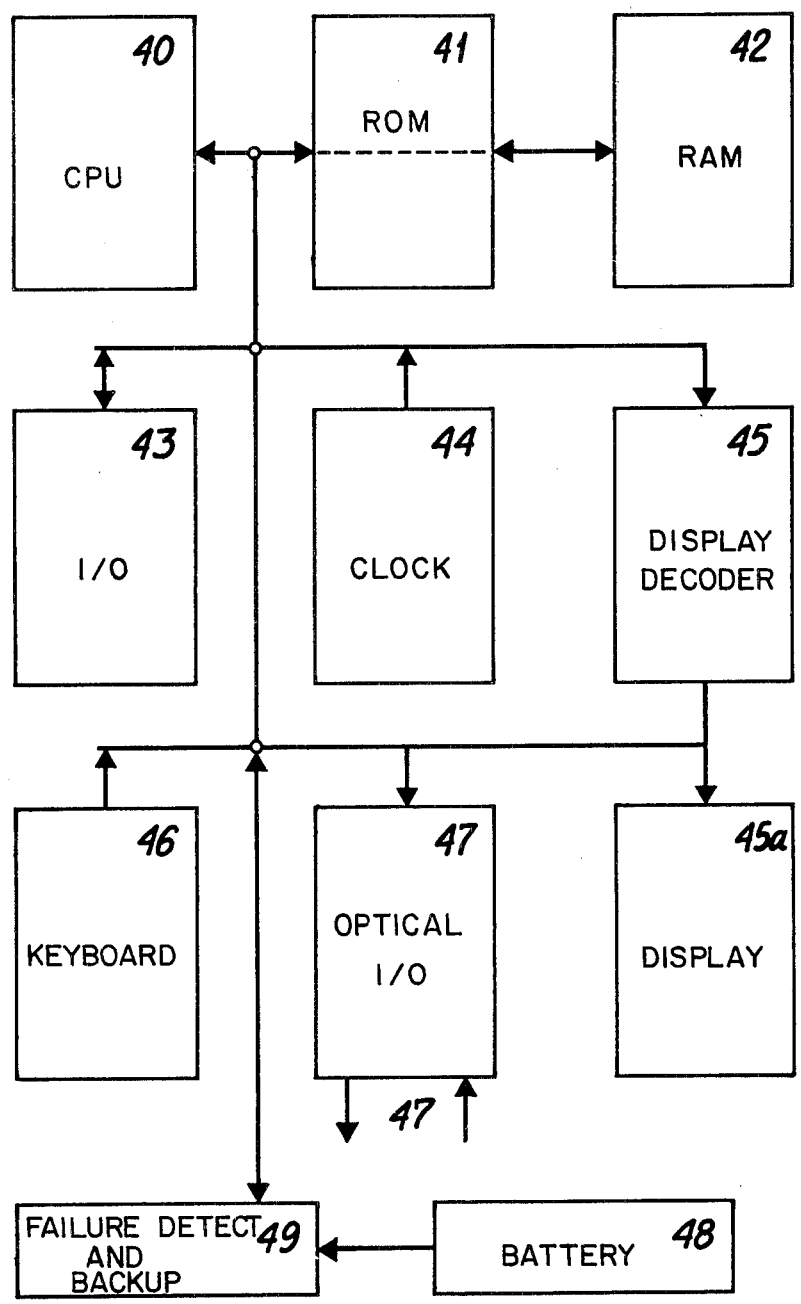
FIG. 4 shows a functional diagram and a block diagram of a device in accordance with the present invention and FIGS. 5 & 6 show a more detailed wiring diagram for the device in accordance with the present invention.

FIG. 4 shows a functional diagram and a block diagram for the device in accordance with the present invention. The invention makes use of a central unit 40 which is connected by means of a bundle of cables to a permanent programmable memory 41. This memory is itself connected to a random access memory 42. A so-called input/output unit 43 is needed to run the central unit 40 and the memories 41 and 42, and a real-time clock 44 is used in view of the fact that the device in accordance with the invention is assumed to be so designed as to be capable of making time-related financial transactions.

The reference 45 is used to indicate a de-coder for the digital display. This de-coder is also known as a display de-coder.

A keyboard 46 is required for the control of the operating cycle of the central unit.

An optical link 47 (optical contact) is provided to enable the read-out of information from the memory 42 and to permit the input into the main memory of a number of units of information corresponding to a fee which has been paid.

The de-coder 45 is connected to the actual digital display 45a. Reference 48 is used for a main battery which is connected to a stand-by battery and a fault detector 49.

Figure 5:
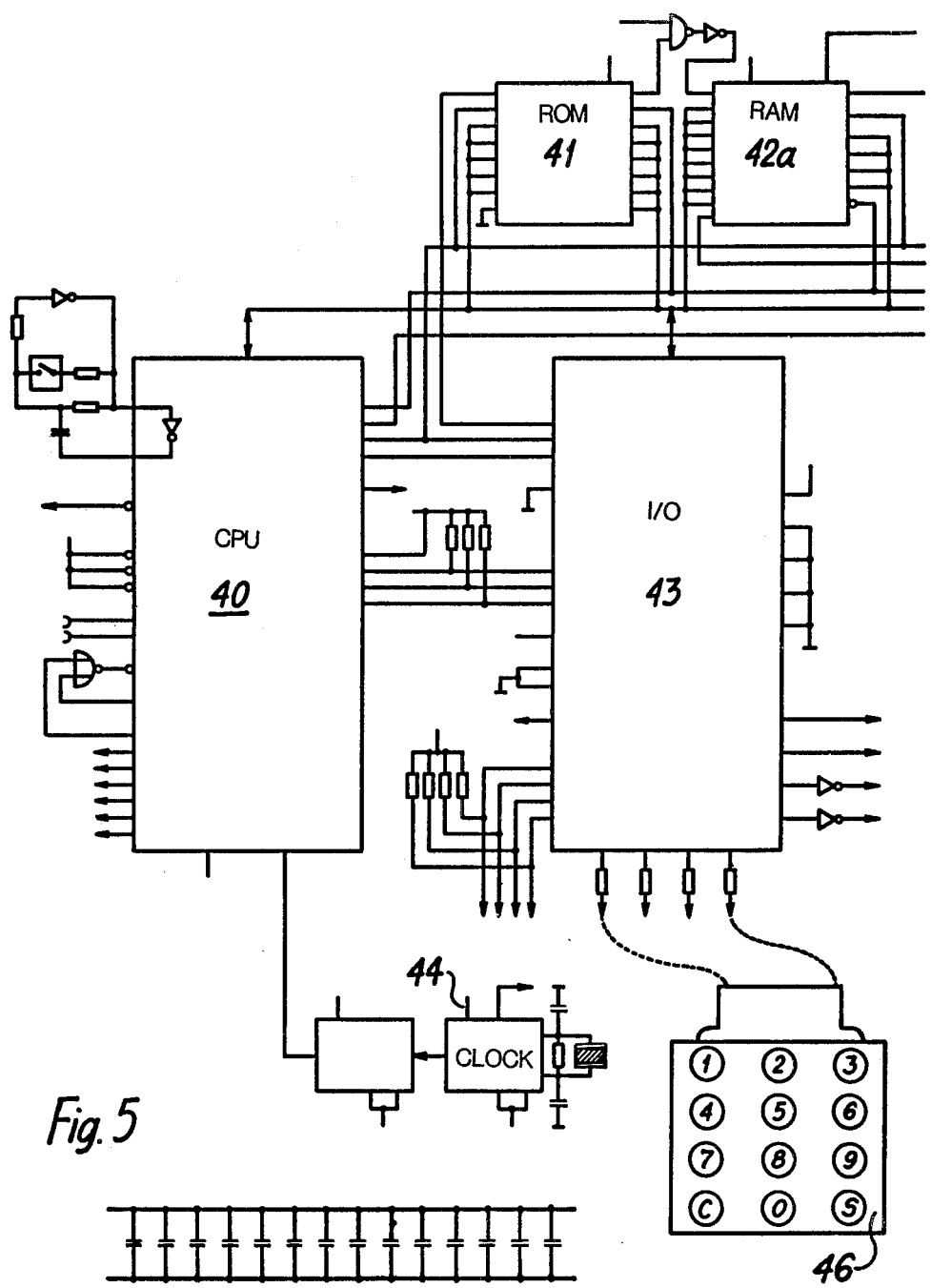
Figure 6:
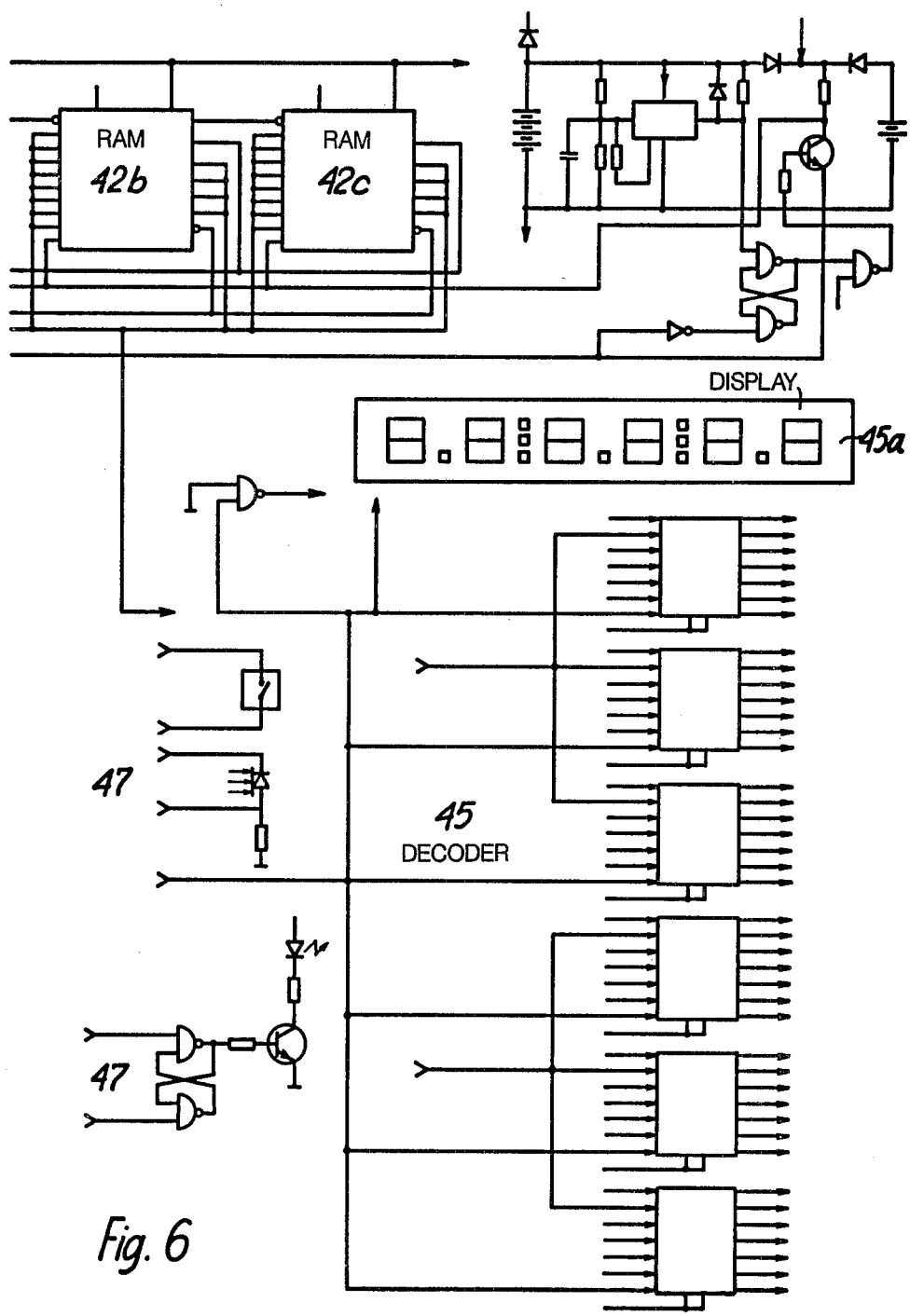

FIGS. 5 and 6 show a more detailed wiring diagram for the device in accordance with FIGS. 2 and 4.

It may be seen from FIG. 5 that the microprocessor 40 shown in FIG. 4 consists of a microprocessor of the type IM6100 sold by "Intersil". This processor is connected by means of the first bundle of cables to the input/output unit 43, in the form of a unit with the designation IM6101, and is also connected partly by means of the same bundle of cables and partly by means of a second bundle of cables to a programmed memory 41, in the form of a permanent memory consisting of a memory with the designation TM6312.

The input/output unit 43 is connected to a keyboard 46.

To the programmed memory 41 with its permanently entered programme are connected a number of random access memories 42, each of which consist of a unit with the designation TM6561, but of which only one (42a) is shown in FIG. 5, whereas two (42b and 42c) are shown in FIG. 6. A real-time circuit 44 is also shown in FIG. 5.

In addition to the aforementioned random access memories 42b and 42c, FIG. 6 also shows a de-coder 45, input and output circuits 47 for an optical link and a digital display device 45a operating on the liquid crystal principle.

The internal wiring of the above component parts of the device is directly dependent on the following specification, on the basis of which experts in this area will be able to connect up the internal wiring.

Specification of the device in accordance with the invention

The following specification illustrates the function and the construction of the device in accordance with the present invention when used in conjunction with a parking system of the kind described briefly on page 6 and in FIGS. 1–3.

The system may be used to great advantage by parking companies on a national basis, but also has a more regional application.

The device is capable of storing the information which is required in the case of parking spaces which are owned or managed by various principals, as well as in the case of parking spaces which are divided up into the following categories depending on their accessibility:

Service parking (S) (includes parking spaces intended for use by the general public);

Permit parking (T) (includes parking spaces which may be used only with the express permission of the principal).

The following are examples of S-parking
  Local authority car parks in which the road traffic regulations apply;
  Car parks for visitors to Government authorities;
  Car parks for visitors to County Council and Provincial Government offices;
  Parking facilities provided at travel terminals;
  Multi-storey car parks and parking facilities, etc., for use by the general public.

Examples of T-parking are: car parks at the place of residence, at the place of work and employees' car parks. It may be assumed that the number of parking spaces used for T-parking is considerably greater than the number of spaces used for S-parking.

The conditions which govern T-parking are usually controlled by individual or collective agreement. Present-day T-parking is based on a maximum daily charge or on a weekly or monthly rental for a particular parking space.

The device in accordance with the present invention enables a maximum daily charge to be levied, but without the need to allocate a specific parking space to each motorist.

Each of the principals operating S-parking facilities is allocated an individual, three-digit principal's number which forms part of the information number of the system (the PX-number).

Each of the principals operating T-parking facilities is allocated an individual, six-digit number (the TX-number). In addition to this, the larger operators of T-parking facilities are allocated a three-digit number from the series of numbers used for S-parking facilities, which is to be used for visitors' parking spaces within the T-parking facility.

1 PREMISES WHICH APPLY GENERALLY TO THE DEVICE 1.1 Identification of systems and device "B" (PX-meter)

The following are some of the respects in which a parking system may differ from other systems:
  Each system has its own system association code which is exchanged during communication between a device and a terminal (the LX-terminal);
  The PX-meters in a given system may use a visual symbol to indicate system association;
  Every PX-meter in a particular system will have its own individual identity number of 24 bits which is programmed into a special memory 42;
  Every PX-meter has a visual serial number so positioned that a supervisor can see the number when the PX-meter is placed in the parked position;
  Every PX-meter can be programmmed. Every PX-meter is programmed on first being issued with the year (1 figure, 4 bits) and the week number (2 figures, 8 bits).

1.2 PX-meter memories 1.2.1 Main Memory ($M_H$) with reference designation 42

This is a non-permanent memory and may be seen from FIG. 5 to consist of three separate units 42a–42c. This memory is able to store that number of markers which is in use at any given time, and markers may be added, etc.

The memory selected for the typical embodiment has a maximum capacity of +2047 to −1023, i.e. 3070 markers.

1.2.2 Accounting memory ($M_R$) with reference designation 42

Every principal whose parking facilities have been used at all since the most recent reading of a PX-meter was made for accounting purposes will have an accounting memory at his disposal in the PX-meter until the date of the following reading for accounting purposes.

The accounting memory contains the principal's code, which has available 3 coded decimal digits, as well as a number of markers which are deducted from the main memory when the principal's code was entered.

The $M_R$ is scanned each time the PX-meter is inserted into the terminal and the resulting information may be read-off on the terminal unit.

Every accounting memory shall have sufficient capacity for a quantity of markers which is greater than or equal to 3070, and the accounting memories shall be eight in number.

1.2.3 Permit memory ($M_T$) with reference designation 42

In order for parking to be permitted in spaces for which the express permission of the principal is required, the TX-number relevant to that permit parking facility must be programmed into a permit memory.

The TX-number identifies the principal, and the six-digit number will commence with either an 8 or a 9. The permit memories shall be three in number.

Every permit memory shall be capable, with the help of an individual programming unit, of being programmed with the following details:

| Principal | 8 or 9 followed by 5 figures |
|---|---|
| Time limit for permit | 1 figure (0–9) |
| Tariff number A | 3 figures (0–7 posn.1 + 2 figures posn 2 and 3) |
| Period for tariff number A | 4 figures |
| Tariff number B | 3 figures (as for tariff no. A) |
| Period for tariff number B | 4 figures (00–24) |
| Maximum daily charge (whether or not collected) | A symbol. |

The maximum charge is determined by the tariff number or by the tariff number together with its time interval.

The reference code used to indicate the time limit for the permit is checked during communication between the PX-meter and the LX-terminal. Once the point in time at which the permit ceases to be valid has been passed, the permit in question will be erased and the motorist will be advised of the change when he goes to the LX-terminal (i.e. details of the permit which has been withdrawn). The three-digit tariff numbers and any time intervals which are associated with them will determine the sum debited against the accounting memory to which the respective TX-number relates.

The three permit memories are allocated the following principal's codes (corresponding to positions 4–6 in a six-digit PX-number in an S-parking facility), i.e. the accounting memory is programmed identically to the corresponding T-memory when it is used in connection with a parking facility.

| Permit memory 1 | Principal's code 001 |
|---|---|
| Permit memory 2 | Principal's code 002 |
| Permit memory 3 | Principal's code 003 |

The parking fee is governed by the maximum charge per day or per part of a day in the same way as the maximum daily charge in an S-parking facility.

A maximum permitted parking period is rarely encountered in T-parking facilities. Where the tariff number has a group code 0 or 1, this indicates that the maximum permitted parking period (tariff number position 3 ) is governed in a similar fashion to the maximum period in an S-parking facility with the same tariff number.

During communication between the PX-meter and the LX-terminal, and where the accounting memories have been allocated principals' codes 001, 002 or 003, a read-out is taken of the TX-number contained in the permit memory relating to the respective principal code, which is then recorded in the LX-terminal together with the number of PX-markers.

1.2.4 Time memory ($M_K$) with reference designation for the clock 44 via 40 to 42

The time is accounted for in the PX-meter in a time memory and is generated for the clock 44 and is controlled by the processor 40 to the memory 42.

| $M_K$ memory capacity | |
|---|---|
| Minutes | 00–59 |
| Hours | 00–23 |
| Week number (8 bits) | 01–53 (week 1 = 1st Monday in Jan) |
| Weekdays | 1–7 (Monday = day 1; Tuesday = day 2, etc.) |

During communication between the PX-meter and the LX-terminal, the accuracy of the crystal oscillator is checked and the times shown above are corrected to their true values. The PX-meter shall be replaced if the crystal oscillator has produced an error greater than 2 minutes per month.

$M_K$ is "frozen" in position when the PX-meter is switched off. This may occur if the date is exceeded and on instruction by the LX-terminal.

1.2.5 Memory for regional association of LX-terminal ($M_{LX}$) with reference designation 42

The PX-meter shall remember the week number and the regional association of the LX-terminal on the most recent visit.

| Memory capacity | |
|---|---|
| Regional number of LX-terminal | figure 0–9 |
| Week number | figure 00–53 |

These details are programmed into the PX-meter from the LX-terminal.

1.2.6 Memory for switching off before LX-visit ($M_A$) with reference designation 42

The PX-meter will be switched off to prevent its use in connection with parking for various reasons until the LX-terminal has been visited; these reasons include
    need for battery replacement, i.e. the programmed week number ($V_B$) has been exceeded. $V_B$ is programmed into the PX-meter from the LX-terminal each time the battery is replaced;
    need for accounts to be updated, i.e. the programmed week number ($V_R$) has been exceeded. $V_R$ is programmed into the PX-meter from the LX-terminal each time the accounts are updated.

The capacity of the $M_A$ memory for $V_B=01$ to 53

The capacity of the $M_A$ memory for $V_R 6$ 01 to 53

Switching off of the PX-meter will not take place in the P-position for the reasons referred to above.

The PX-meter will give an advance warning signal in both cases ("warning condition" will appear on the display) for an LX-visit 2-4 weeks before $V_R$ and $V_B$ respectively.

Other reasons for switching off before a visit has been made to the LX-terminal include main memory has a negative value (no switching off in P-position);

main memory has reached its maximum negative value in P-position;

power supply failure in P-position (B-cell to be used);

power supply failure (cut) in P-position (B-cell used).

In order to facilitate the resolution of legal disputes between principals and the holders of PX-meters in the event of incorrect parking, the point in time at which the PX-meter was switched off—for whatever reason—shall be "frozen" in the time memory $M_K$.

On future visits to the LX-terminal, a record shall be made of the serial number of the PX-meter together with details of the time at which it was switched off, the reasons for switching off and any subsequent steps which were taken, e.g. replacement of the PX-meter for service or steps taken to correct the reason for switching off.

1.2.7 Memory for PX-markers used ($M_{PX}$) with reference designation 42

The memory is designed to accumulate the total number of PX-markers entered into the H-memory and also to indicate the elapsed time or the number of markers accumulated since the start.

$M_{PX}$-capacity:

Total number of PX-markers in the H-memory (in hundreds) 0-256

1.3 Car climate

The PX-meter shall be capable of withstanding the stresses imposed on it by the "car climate". The expression "car climate" in this context shall be taken to indicate on the one hand the climatic conditions—temperature, dampness and dust, etc., and on the other hand the mechanical stresses and the electronic/magnetic interference which is present in and adjacent to the driver's seat in a motor vehicle.

The conditions which the PX-meter shall be capable of withstanding include the following:

Mechanical stresses

Free fall from a height of 1.5 m onto a hard base (no functional faults and no deformation of the casing or of internal and external component parts).

Damp and dust

Humidity of the air;

Waterproof in accordance with the Standards which are applicable to wristwatches;

Dust and dirt. Normal levels encountered in the driver's compartment shall not influence the function of the PX-meter in the P-position.

1.4 Requirements for convenience of operation of PX-meter Convenience demanded by the motorist The keying-in operation shall be capable of being done comfortably and reliably;

Displays shall be capable of being read with ease in daylight and when illuminated by the electric roof light in the driver's compartment;

The PX-meter shall be capable of being hung rapidly and easily from the sun visor on the driver's side when in the P-position;

Easily portable to and from the vehicle when visiting the LX-terminal;

The PX-meter shall indicate the correct time before the PX-number is keyed-in;

Before the PX-meter is hung in its P-position, the driver using an S-parking facility shall be able to interrogate it in order to establish the PX-numbers and time intervals which have been programmed into the PX-meter;

The PX-meter shall provide details of the number of markers contained in the H-memory, if requested so to do;

The PX-meter shall give advance warning when a visit should be made to the LX-terminal.

Convenience demanded by LX-terminal service personnel

Rapid and convenient replacement of batteries;

Rapid entry and read-out of PX-meter;

Simple financial transaction for entry of required number of markers into PX-meter.

2. STRUCTURE AND SIGNIFICANCE OF INFORMATION NUMBERS USED IN THE PX-SYSTEM

The six-digit number on PX-sign "A" shows details in coded form relating to the conditions of parking and the identity of the principal operator of the parking facility. The information number has the following designation and is made up of the serial numbers below:

S-parking: Space and charge number=PX-number 000.000–799.000

T-parking: Permit number=TX-number 800.000–999.999

2.1 PX-number for S-parking (000.000–799.999)

The PX-number consists of two three-digit groups with the following designations

| Tariff number: | Group of figures in position 1-3 |
|---|---|
| Number for principal operator of S-parking: | Group of figures in position 4-6 |

2.1.1 Tariff number (Position 1-3)

The tariff may adopt any value between 000-799 and the position of the figures is as follows:

| Position 1 | Group code | (0-7) |
|---|---|---|
| Position 2 | Charge rate code | (0-9) |
| Position 3 | Maximum time/price code | (0-9) |

The parking charge per unit of time, the maximum period for which a vehicle may be parked and the maximum charge per day or per part of a day may vary both according to the time of day and depending on the day of the week. Group codes 0-7 are used in order to vary the parking charge per unit of time (position 2);

determine whether maximum period or maximum charge shall apply (position 3);

provide different tariffs for days of the week 1-5 and 6.

2.1.1.1 Charge rate code. Parking charge per unit of time (position 2).

The parking charge per unit of time is shown in Tables A and B below in terms of kronor per hour and the period length is shown in seconds for a PX-marker.

The Tables were compiled on the basis of a basic period length $B_P = 3$ seconds. N indicates the number of times $B_P$ is taken to produce a single marker. $N \times B_P$ = the period length in seconds for a single marker in the respective charge rate. The cost of a marker = 10 units (öre).

TABLE A

| No. | kronor/hour | length of period sec/marker |
|---|---|---|
| 0 | 0 | ∞ |
| 1 | 0.1 | 3600 |
| 2 | 0.15 | 2400 |
| 3 | 0.2 | 1800 |
| 4 | 0.25 | 1440 |
| 5 | 0.3 | 1200 |
| 6 | 0.4 | 900 |
| 7 | 0.5 | 720 |
| 8 | 0.75 | 480 |
| 9 | 1.0 | 360 |

TABLE B

| No. | kronor/hour | length of period sec/marker |
|---|---|---|
| 0 | 1.5 | 240 |
| 1 | 2.0 | 180 |
| 2 | 2.5 | 144 |
| 3 | 3.0 | 120 |
| 4 | 4.0 | 90 |
| 5 | 5.0 | 72 |
| 6 | 6.0 | 60 |
| 7 | 8.0 | 45 |
| 8 | 10.0 | 36 |
| 9 | 12.0 | 30 |

Table A applies to group numbers 0, 2, 4 and 6
Table B applies to group numbers 1, 3, 5 and 7

The figures which appear in the columns headed "No." in the Tables are also to be found in position 2 of the tariff number. The charge rate code is thus made up partly of the group number and partly of the number in position 2.

2.1.1.2 Code for the maximum parking period (position 3)

A maximum period of parking is used mainly in order to control the rate of occupancy of the respective parking spaces (max. period $\leq 4$ hours). The maximum period of parking may also be used to control the duration of the longest period during the day for which a fee is charged (max. period $\geq 10$ hours).

TABLE C

| No. | maximum period | Visual marking | Notes |
|---|---|---|---|
| 0 | 1-15 min. | (white) | Target time. Programmable. |
| 1 | 0.5 hours | red | |
| 2 | 1 hour | yellow | |
| 3 | 2 hours | grey | |
| 4 | 4 hours | green | |
| 5 | 10 hours | — | |
| 6 | 12 hours | blue | |
| 7 | 14 hours | — | |
| 8 | 24 hours | — | |
| 9 | no limit | — | |

Table C applies to group numbers 0 and 1.
The figures which appear in the column headed "No." in Table C are also to be found in position 3.

The code for the maximum parking period is thus made up partly of group numbers 0 or 1 and partly of the number in position 3.

2.1.1.3 Code for the maximum charge per day or part of a day (position 3)

Parking spaces which are not used on the basis of a maximum parking period will frequently have a maximum charge per day or per part of a day. The maximum charge may be levied in the form of a once-only charge, i.e. the full daily rate (or the rate for part of a day) is charged on the first occasion on which a vehicle is parked on that particular day. No additional parking fee will then be charged for the rest of the day, even though the vehicle may occasionally leave the parking space in question (applies only to T-parking).

A maximum charge may also be levied during a specific number of hours on the basis of an hourly rate which is determined partly by the group code which appears in position 1 and partly by the charge rate number shown in position 2. The number of hours may be seen in Table D.

TABLE D

| No. | Number of hours for which an hourly rate is charged |
|---|---|
| 0 | once-only charge |
| 1 | 1 hour |
| 2 | 2 hours |
| 3 | 3 hours |
| 4 | 4 hours |
| 5 | 5 hours |
| 6 | 6 hours |
| 7 | 7 hours |
| 8 | 8 hours |
| 9 | 24 hours |

Table D applies to groups 2-7, and the figures which appear in the column headed "No." in the Table are also to be found in position 3 of the tariff number.

The once-only charge means that the hourly rate in accordance with positions 1 and 2 is payable immediately ($\leq 10$ minutes).

The maximum charge per day or per part of a day shall apply only to uninterrupted parking during the period in respect of which the charge has been levied. As one day becomes the next (at 00.00 hours), any maximum charge which has been levied for the previous day or any fee paid for parking which is continuing at the changeover point between one day and the next will be cancelled. The maximum charge for the new day is levied with effect from 00.00 hours.

The maximum charge for part of a day may be levied no more than two times on any one day (including separate maximum fees) on condition that none of the time intervals relating to the respective charges includes the time 00.00 hours.

If a maximum charge is levied in respect of a time interval which includes the changeover point between one day and the next, then the maximum charge for the time interval in question may be levied only in the form of the hourly rate multiplied by the number of hours which make up the time interval in question.

2.1.1.4 Group code (position 1)

The group code may include the figures 0-7.

Group 0-1 is used in conjunction with S-parking facilities in which each individual parking space is subject to a maximum period of use. The value of the maximum period may be seen from Table C. The charge rate in kronor per hour is determined in the case of Group 0 from Table A, and in the case of Group 1 from Table B.

Group 0-1 may be used on all days of the week (days 1-7).

Group 2-3 is used in conjunction with S-parking facilities in which each individual parking space is not subject to a maximum period in order to increase use, but may be subject to a maximum charge per day or per part of a day. Group 2 uses the charge rates shown in Table A, and Group 3 uses those shown in Table B. The maximum daily charge is shown in Table D.

Group 2-3 may be used on all days of the week (days 1-7).

Group 4-5 is used in conjunction with S-parking facilities as described in Group 2-3 above, with Group 4 using a scale of charges in accordance with Table A and Group 5 using a scale of charges in accordance with Table B.

Group 4-5 may be used only from Monday to Friday (days 1-5).

Group 6-7 is used in conjunction with S-parking facilities as described in Group 2-3 above, with Group 6 using a scale of charges in accordance with Table A and Group 7 using a scale of charges in accordance with Table B.

Group 6-7 may be used only on day 6 of the week.

When used in conjunction with S-parking facilities, Groups 2-7 are intended to permit parking for a period which may, for instance, extend over a weekend or for a longer period without the need to re-set the PX-meter, by utilizing programmed time intervals which determine the tariff numbers which will be charged at different times of the day.

2.1.2 Principal's code for S-parking facilities (positions 4-6)

Each of the principal operators of an S-parking facility is allocated an individual three-digit principal's code between 000-999, which is programmed into positions 4-6 of the PX-meter when parking takes place.

2.2 TX-number for T-parking facilities (800 000-999 999)

The six-digit TX-number (with an initial FIG. 8 or 9) is a principal's code and appears on a sign displayed at the parking space, which may only be used with the permission of the principal.

When in the P-position, the display of the PX-meter will show this TX-number only on condition that the TX-number in question has been programmed into the permit memory ($M_T$) of the PX-meter. Also programmed into the $M_T$ are the tariff number and the time interval which govern the parking charge per unit of time and the maximum charge per day or part of a day, as well as any parking restrictions which apply during part of the day or on certain weekdays. The tariff number has three digits and is structured in the same way as tariffs for the PX-numbers. The information contained in $M_T$ governs the transfer of the PX-markers from the H-memory to the R-memory (from the main memory to the accounting memory).

When in the parking position, the display will indicate the appropriate TX-number on condition that no restriction has been imposed on the right to park. In this case, the display will indicate 000.000 if parking is taking place during a prohibited period.

The distribution of the TX-numbers across geographical regions, the type of parking (place of work, place of residence, employees' parking, etc.) and the type of parking building may be selected at random.

3 COMPONENT PARTS OF THE PX-METER

The basic appearance of the PX-meter and its external parts may be seen in FIG. 2.

The following are the *external* parts of the PX-meter and their functions:

| | |
|---|---|
| Casing | Mounting for and protection of PX components; |
| Display | Visual monitoring of the condition of the PX-meter; |
| Keyboard | Communication with the electronic control circuits of the PX-meter; |
| Batteries | Supply of operating power. |

The following are the *internal* parts of the PX-meter and their functions:

| | |
|---|---|
| Crystal oscillator | Time measurement; |
| Start switch | Start - stop function; |
| LX interface | Communication with the LX-terminal; |
| PXE | Electronic control circuits; |
| Battery | "Back-up" battery for random access memories. |

3.1 External parts of the PX-meter 3.1.1 Casing

The casing provides a mounting for the component parts and is intended to protect them and their functions against operating breakdowns. The design of the casing shall favour the convenience of operation of the PX-meter.

The casing shall be made up of two separate areas
one of which is totally enclosed and serves as a mounting and protection for the component parts (excluding the operating battery) and is so designed that in the event of anyone attempting to enter the space the casing will be deformed so that the attempted entry may easily be discovered on examination; and
another which provides the PX-meter with its operating power supply.

3.1.2 Display

The figures of the display shall be clearly visible in daylight and from outside the vehicle in the dark under normal street lighting conditions or with a torch, and from inside the vehicle with the roof light illuminated. The figures shall be visible from outside the vehicle at a distance of $\geq 2$ m from the position of the PX-meter (with the help of a torch, if necessary, in the dark).

A typical example of a suitable display is that manufactured under the designation G0 D7 R05bH (LCD-displays) by LXD Inc., USA.

4.1.3 Keyboard

The keyboard is in the form of a board with 12 keys—number keys 0-9, a correction key C and a key marked S. The keys are positioned as follows

| 1 | 2 | 3 |
|---|---|---|
| 4 | 5 | 6 |
| 7 | 8 | 9 |
| C | 0 | S |

A typical example of a suitable keyboard is that manufactured by Chomerics under the designation FR22782.

Mode of operation

The maximum rebound time for a key is 1 ms. Two depressions of a key separated by an interval of less than ⅛ second will be recorded as a single depression. Two depressions of a key separated by an interval of more than 2/8 second will always be recorded as two depressions.

Final estimation of time is done in conjunction with testing.

The time required for the display to be illuminated after contact has been made may be delayed as long as possible in relation to the time intervals referred to above.

3.1.4 Operating batteries

The power supply to the PX-meter is provided by two types of battery battery A for operating power supply;

back-up batteries (B-cells) to guarantee that the contents of the power-consuming memories will not be lost in the event of the A-batteries being disconnected.

The A-batteries are located in the battery space within the casing, where they are easily accessible to the LX-operater. The person to whom the PX-meter has been issued may not replace the batteries before the condition of the batteries has been established.

The B-batteries are located in the totally enclosed area of the casing and are used only during the short periods for which the A-battery is out of service, for instance when the battery is being replaced.

The B-battery is not to be replaced, its service life being identical to that of the PX-meter.

The B-battery is considered to be one of the internal components of the PX-meter.

3.1.4.1 Battery data

The power supply is provided by four Type R6 1.5 volt alkaline batteries.

Nominal voltage: 1.3 volts

Lowest operating voltage: 0.1 volt

Power consumption by the PX-meter should be such that a maximum of two battery replacements per year are required where the number of PX-markers per month is $\leq 3000$.

3.1.4.2 Battery function

The function of the PX-meter should not be affected if the current from the battery flows in the wrong direction;

The time of replacement for the battery shall be programmed into the PX-meter. If the time limit is exceeded, then the PX-meter shall be switched off "for use only after LX-visit". The meter shall not be switched off when in the P-position;

The PX-meter shall be switched off for an LX-visit whenever the battery space has been opened;

A PX-meter which has been switched off for an LX-visit shall freeze the point in time at which it was switched off in the time memory $M_K$.

Whenever the batteries are replaced, the PX-meter shall be programmed with the week number ($V_B$) indicating the time at which the batteries will next require replacement.

3.2 Internal components of the PX-meter

All the components described in this section are located within the totally enclosed space inside the casing.

3.2.1 Crystal oscillator with reference designation 44.

The crystal determines the accuracy with which the time is indicated by the clock. It shall be accurate to $\leq +2$ minutes per month.

The clock time shall appear on the display when the PX-meter is in the base condition, with the hour (00–23) and the minutes (00–59) in positions 2–5 on the display.

The necessary time information (see section 1.2.4) shall be stored in the time memory $M_K$.

A check shall be made via the LX-terminal to ensure that the accuracy of the crystal oscillator has been within 2 minutes per month. The information contained in the time memory shall be corrected to indicate the true time.

3.2.2 Start switch

The PX-meter shall charge only when in the P-position, i.e. when it is inside the vehicle and suspended from the PX-meter attachment point on the sun visor.

The start switch is in the form of a magnetic contact inside the PX-meter.

Debiting of the markers from the main memory and recording of the parking period which is to be debited against the time limit contained in the tariff number may only take place if the magnetic contact has been closed for an uninterrupted period of $t_a$ minutes (target time).

$t_a$ shall be capable of being programmed in "one-minute intervals" and of assuming values ranging from 0 to 15 minutes.

Parking shall be regarded as having ended if the magnetic contact has been interrupted for a period of 1 minute. Debiting of both markers and time will stop once the magnetic contact has been interrupted. If the magnetic contact is re-made within one minute and if there has been no new programming, then debiting of both markers and time will continue as before.

Once the magnetic contact has been broken, the displays will show the actual tariff number in the P-position for the first minute.

If the correction key is depressed twice whilst the magnetic contact is interrupted, then the PX-meter will return to the "base" condition of the holding position.

3.2.3 Interface between PX-meter and LX-terminal

Communication between the PX-meter and the LX-terminal takes place via an optical link and/or two-way wiring. The communication procedure requires that the system association requirements be met before the communication may be approved and registered.

The PX-meter is locked into the LX-terminal (LX-position) once the communication has been approved and registered.

When in the LX-position, the requirements of the PX-meter in relation to the LX-terminal are described in the following section.

3.2.3.1 PX-meter in base condition;

3.2.3.2 PX-meter in warning condition;

3.2.3.3 PX-meter switched off for visit to LX-terminal;

3.2.3.4 PX-meter in "dead condition" or faulty.

3.2.3.1 PX-meter in base condition

When in the base condition, the display of the PX-meter will show the "true" time—in hours and minutes. The time is shown in positions 2–5 on the display.

The relationships between PX-LX may vary in the following sequence (communication ready):

1. The identity number of the PX-meter shall be checked if the locking unit is connected to the LX-terminal. (Alternatively: the visual serial number of the PX-meter shall be entered via the keyboard of the PX/LX-reader and checked against the central locking arrangement).

2. The PX-meter shall be interrogated in respect of all the memories contained in the random access memory (item 42) and these shall be programmed into the equivalent memory in the LX-terminal.
3. The "client" display of the LX-terminal will automatically show the number of markers contained in the $M_H$.
4. At the request of the client, the "client" display of the LX-terminal may also show
   the content (programming) of the permit memories 001–003;
   the content of the memory relating to the consumption of PX-markers ($M_{PX}$).
5. Checking and interrogation of the following PX-memories after they have been transferred to LX-terminals:
   Permit memories
   Accounting memories
   Time memory together with recordings and programming changes attributable to the above.
6. Inspection of internal and external components, table values which have been programmed-in and functions.
7. Ready signal for input of PX-markers into the main memory.
8. Input of PX-markers. LX client display will automatically show the new PX-marker values contained in the main memory. The starting value of the main memory may also be shown on request.
9. The total number of PX-markers, in units of one hundred markers, fed into the main memory is accumulated in the memory for the PX-markers which have been used ($M_{PX}$). The LX-terminal is programmed in such a way that when the accumulated value of markers in the PX-meter exceeds A units of 100 markers ($40 < A < 128$), then the number of weeks over which the markers were used will be recorded. The accumulated value of PX-markers in the $M_{PX}$ will be reduced by A at the same time as the transaction code and the week number are programmed into the $M_{PX}$.
10. The ready signal in the PX-reader indicates that the PX-meter has been checked and is ready for issue to the client. A special completion contact in the PX-reader will release the PX-meter from the LX.

3.2.3.2 PX-meter in warning condition

The PX-meter will show the warning condition on the display only when it is in the holding position. The display will then show in positions 3–6 the number of PX-markers contained in the main memory.

The warning condition will be shown for the following reasons:
$M_H$ contains $\leq 250$ PX-markers;
$M_R$ contains $\leq 1$ memory which is not in use;
Battery replacement required within $\leq 3$ weeks;
Updating of accounts in the LX-terminal required within $\leq 3$ weeks.

The relationships between PX-LX may vary in the following sequence (communication registered):
1. The identity number of the PX-meter shall be checked if the locking unit is connected to the LX-terminal.
2. The "client" display of the LX-terminal shows reasons for warning condition.
3. Batteries to be replaced, if required.
4. The relationships may vary in the sequence indicated in section 3.2.3.1 with the PX-meter in its base condition, items 2–10.

3.2.3.3 PX-meter switched off for visit to LX-terminal

The display will indicate the figure "8" in positions 1 and 6 when the PX-meter is switched off.

The PX-meter may be switched off in its holding position for the following reasons
Time limit for battery replacement exceeded;
Time limit for updating of accounts exceeded;
$M_H$ has a negative value;
Battery space has been opened.

The PX-meter may be switched off in the P-position for the following reasons
$M_H$ has reached its maximum negative value;
Batteries providing insufficient operating power (B-cell brought into use).

The relationships between PX-LX may vary in the following sequence (communication registered):
1. The identity number of th PX-meter shall be checked if the locking unit is connected to the LX-terminal.
2. The LX-terminal will check the reason for switching off and will indicate the reason on the "client" display together with the point in time at which switching off took place. The reason for switching off, the time of switching off, the identity number of the PX-meter and the date of the LX-visit together with any measures taken shall be recorded in the LX-terminal.
3. Batteries to be replaced, if required.
4. The relationships may vary in the sequence indicated in section 3.2.3.1 with the PX-meter in its base condition.

3.2.3.4 PX-meter shows "dead condition" or some other condition on the display

No communication between PX-LX may be registered in this position, and the operator of the LX-terminal shall be required to proceed in accordance with specific instructions.

3.2.4 PXE control electronics

The control electronics consist of a microprocessor and/or a custom-design-circuit and ROM and RAM memories. The function of the control electronics is determined partly by the above specification and partly by the functional description which follows.

3.2.5 "Back-up" battery for RAM memory 42

The aim of the back-up battery (the B-cells) is to guarantee that the information contained in the RAM memory 42 will not be lost in the event of failure of the operating voltage or of the A-batteries becoming discharged.

The A-batteries and the B-cells shall be connected in such a way that in the event of the voltage supplied by the A-batteries falling below the voltage of the B-cells, then the B-cells will take over the supply of power. The internal clock shall be "frozen" and the PX-meter switched off until a visit has been made to the LX-terminal, even though the operating voltage may be at a sufficiently high level.

The B-cells shall last for the service life of the PX-meter, which is $\geq 5$ years, and shall be situated within the totally enclosed space inside the casing.

4 FUNCTIONAL DESCRIPTION OF THE PX-METER

This functional description presents the logical sequence in which the PX-meter operates and the changes which may be made to the PX-meter, and is of use to those who use the system—PX-holders and principal operators of the parking facilities.

4.1 Concepts and definitions used in the functional description

Positions of the PX-meter

| | |
|---|---|
| PX-meter in P-position | The PX is attached to the sun visor of the vehicle with the magnetic contact in the closed position; |
| PX-meter in V-position | The PX-meter is at rest or is being programmed before being set in the P-position; |
| PX-meter in LX-position | The PX-meter is locked into the LX/PX-reader. |

Condition of the PX-meter

| Condition | Display shows | Explanation |
|---|---|---|
| Dead condition | Operating batteries not working | — |
| Base condition (H) | PX-meter ready. Not programmed for parking | 13 . 04 | Time (posn. 2–5) |
| Ready condition (R) | S-key depressed - one single depression | . | Only points are visible |
| Information condition (I) | 6-digit tariff number entered | 142 . 020 | PX-number or TX-number |
| Information condition (I) | 4-digit time interval entered | 08 . 18 | Time interval 08.00–18.00 (posn. 2–5) |
| Warning condition (V) | Warning "visit LX-terminal" appears | 0 . 946 | Marker in main memory (posn. 3–6) |
| LX-condition | PX-meter switched off "will only start after visit to LX" | 8 . 8 | (posn. 1 & 6) |
| Programme condition (Pr) | S-key depressed ≧ two depressions | 1 . 224 | |
| | | 123 . 202 | PX-markers PX(TX)-number |
| | | 08 . 18 | Time interval |

4.2 PX-meter in V-position

The PX-meter is ready for programming if the display shows "base condition" (time) or "holding condition" (main memory marker).

After two depressions of the S-key, the display may move from "base condition" to show "number of PX-markers". "PX-markers" will continue to be displayed if the key is depressed more than twice. The display will return to "base condition" if the C-key is depressed twice.

4.2.1 Programming of the PX-meter for S-parking

| Condition | Display shows/measure | Explanation | P-position |
|---|---|---|---|
| H-condition (warning condition) | 08 . 10 | time by the clock (PX-marker) | |
| | S-key (single depression) | | |
| K-condition | . | | |
| | Number keys (6 figures) | | |
| I-condition | 123 . 456 | PX-number | |
| | S-key (single depression) | | A. to P-position PX-meter works with number 123 . 456 |
| K-condition | . | | |
| | Number keys (4 numbers) | | |
| I-condition | 08 . 18 | Time interval (123 . 456) applies between 08.00–18.00 | |
| | 08.00 - 18.00) S-key (single depression) | | B. to P-position 123 . 456 08–18 000 . 000 18–08 |
| K-condition | . | | |
| | Number keys (6 numbers) | | |
| I-condition | 016 . 456 | PX-number | |
| | S-key (single depression) | | C. to P-position 123 . 456 08–18 016 . 456 18–08 |
| K-condition | . | | |
| | Number keys (4 numbers) | | |
| I-condition | 18 . 22 | Time interval (016 . 456) applies between (18.00–22.00) | |
| | | | D. to P-position 123 . 456 08–18 016 . 456 18–22 000 . 000 22–08 |
| K-condition | . | | |
| into the | No more numerical information may be | entered | |
| | PX-meter. S-key (second depression) | | |
| Pr-condition | 0 . 801 S-key (single depression) | PX-marker | |
| Pr-condition | 123 . 456 S-key (single depression) | PX-number | E. to P-position 123 . 456 08–18 016 . 456 18–22 000 . 000 22–08 |
| Pr-condition | 08 . 18 S-key (single depression) | Time interval | |
| Pr-condition | 016 . 456 C-key (single depression) | PX-number | F. to P-position PX-meter to base condition |
| Pr-condition | . Number keys (6 numbers) | Correction of PX-number | |
| Pr-condition | 026 . 456 S-key (single depression) | PX-number | |
| Pr-condition | 18 . 22 S-key (single depression) | Time interval | G. to P-position 123 . 456 08–18 |

| Condition | Display shows/measure | Explanation | P-position |
|---|---|---|---|
| | | | 026 . 456 |
| | | | 18–22 |
| | | | 000 . 000 |
| | | | 22–08 |
| | 0 . 801 | PX-marker | |
| | etc. | | |

PXE in the V-position will always operate with the following logic
- 1st information condition: PX-number (1)
- 2nd information condition: Time interval for PX-number (1)
- 3rd information condition: PX-number (2)
- 4th information condition: Time interval for PX-number (2)

Any depression of the number keys in excess of 6 or 4 times respectively in the above information conditions will be disregarded. Incomplete information in any of the above information conditions will mean that the PX-meter will not operate in the P-position, but will return to the base position.

The PX-meter may be set to the P-position after each item of information is complete.

Any depression of the S-key will be disregarded if the information is incomplete.

Two depressions of the S-key are used to indicate that the input of information is complete, and that the PX-holder wishes to be advised of what has been programmed-in. The PX-meter will then go to the "programme condition" (Pr-condition).

When in the Pr-condition, the display will first show the PX-marker content of the $M_H$, and will then "leaf through" every time the S-key is depressed to show I-condition 1, 2, etc. Once the most recently entered item of information has been shown, the display will return to the number of PX-markers, etc., after the S-key has been depressed.

A single depression of the C-key, when the display is showing the information condition, will remove the information from the PX-meter (display will indicate ready condition) and new information may then be entered. Corrections may be made to the information in the PX-meter during the leafing-through procedure.

Two or more consecutive depressions of the C-key will always return the PX-meter to the base condition, i.e. all programming will be erased.

A single depression of the C-key when the display is showing ready condition of "PX-markers in $M_H$" will be disregarded.

Whilst "leafing through", the PX-meter may be placed in the P-position at any time, on condition that the information is complete in every programmed information condition.

4.2.2 Programming of the PX-meter for T-parking

In order that the PX-meter may be used in connection with T-parking facilities, it is essential that the permit memory of the PX-meter shall have been programmed with the TX-number which relates to that parking space together with the associated conditions of parking.

When parking, it will be necessary for the PX-meter to show base condition or warning condition on the display when in the V-position.

Programming procedure

The S-key is depressed once, and the display will show the ready condition.

The PX-number is entered, and this will appear on the display. The S-key is depressed once, and the display will show the ready condition.

No more numerical information may now be entered, and any further depressions of the number keys will be disregarded. The points raised in section 4.2.1 "Programming of the PX-meter for S-parking" shall apply to the PR-condition, the hanging up of the PX-meter in the PX-position, and the use of the C- and S-keys.

4.3 PX-meter in P-position 4.3.1 S-parking

The case A- described below relates to the programming specified above in section 4.2.1.

| | | PXE-function | | | | |
|---|---|---|---|---|---|---|
| PX-meter programme | Shown on display in P-position | Charge code | Max. time code | Max. daily charge code | Time interval | Miscellaneous |
| A 123 . 456 | 123 . 456 | 12 | 3 | | | Base condition after max. time exceeded |
| | 15 . 30 | | | | | |
| B 123 . 456 | 123 . 456 | 12 | 3 | | 08–18 | Every day |
| 08 . 18 | 000 . 000 | | | | 18–08 | Shown every day after max. time exceeded |
| C 123 . 456 | 123 . 456 | 12 | 3 | | 08–18 | Every day |
| 08 . 18 | | | | | | |
| 016 . 456 | | | | | | |
| | 000 . 000 | | | | | Shown every day after max. time exceeded |
| | 016 . 456 | 01 | 6 | | 18–08 | Shown every day after max. time exceeded |
| | 000 . 000 | | | | | |
| D 123 . 456 | 123 . 456 | 12 | 3 | | 08–18 | Every day |
| 08 . 18 | | | | | | |
| 016 . 456 | 000 . 000 | | | | | At end of max. period |
| 18 . 22 | | | | | | |
| | 016 . 456 | 01 | 6 | | 18–22 | At end of max. period |
| | 000 . 000 | | | | | |
| | 000 . 000 | | | | 22–08 | |
| E 123 . 456 | | | | | | Same as case D |
| 08 . 18 | | | | | | PX-meter to |

-continued

| PX-meter programme | Shown on display in P-position | PXE-function | | | | Miscellaneous |
|---|---|---|---|---|---|---|
| | | Charge code | Max. time code | Max. daily charge code | Time interval | |
| 016 . 456 | | | | | | base condition |
| F 123 . 456 | 11 . 38 | | | | | Same as case D |
| 08 . 18 | | | | | | but with |
| 18 . 22 | | | | | | charge code 02 |
| | | | | | | instead of 01 |
| G 123 . 456 | | | | | | |
| 08 . 18 | | | | | | |
| 026 . 456 | | | | | | |
| 18 . 22 | | | | | | |

| PX-meter programme | Shown on display in P-position | PXE-function | | | | Miscellaneous |
|---|---|---|---|---|---|---|
| | | Charge code | Max. time code | Max. daily charge code | Time interval | |
| 128 . 456 | 128 . 456 | 12 | 8 | | 08–16 | Every day |
| 08 . 18 | | | | | | |
| 016 . 456 | 016 . 456 | 01 | 6 | | 16–20 | |
| 16 . 20 | | | | | | |
| | 000 . 000 | | | | 20–08 | |
| 128 . 456 | 128 . 456 | 12 | 8 | | 08–12 | Every day |
| 08 . 18 | | | | | | |
| 148 . 456 | 148 . 456 | 14 | 8 | | 12–14 | |
| | 128 . 456 | 12 | 8 | | 14–18 | |
| | 000 . 000 | | | | 18–08 | |

| PX-meter programme | Shown on display in P-position | PXE-function | | | | Miscellaneous |
|---|---|---|---|---|---|---|
| | | Charge code | Max. time code | Max. daily charge code | Time interval | |
| 498 . 456 | 498 . 456 | 49 | 8[1] | | 08–18 | Mon–Fri |
| 08 . 18 | | | | | | |
| 676 . 456 | 676 . 456 | 67 | 6[2] | | 08–14 | Saturday |
| 08 . 14 | | | | | | |
| | 000 . 000 | | | | | Mon–Fri 18–08 |
| | | | | | | Sat 14–20 |
| | | | | | | Sun 20–00 |
| | | | | | | Mon 00–08 |
| | | | | | | (1) Max. charge $8 \times 1$ kr = 8 kronor |
| | | | | | | (2) Max. charge $6 \times 0.5$ = 3 kronor |

5 PX-LX INTERFACE (INTERFACE BETWEEN PX-METER AND LX-TERMINAL)

5.1 PX-LX communication procedure

The LX-terminal emits a pulse train via cables.

The high level is identified with active emitters in this case in order to eliminate the possibility of misunderstandings.

The pulses are approximately 130 ms in length and are separated by intervals of approximately 260 ms.

The registration of the communication occurs by means of the LX-terminal emitting a specific pulse train which is detected by the PX-meter and acknowledged via a cable. The acknowledgement must be given before the fourth pulse following the first complete pulse from the LX which is detected. The active emitter in the PX-meter is identified as high level.

The indicated times are target values. Once a response has been obtained from the PX-meter, the LX-terminal will cut off its pulse train as soon as possible. This may in turn be used as an acknowledgement to the PX-meter.

After it has been activated, the cable will remain in an active state for a number of ms which will then be determined.

In this way the LX-terminal is able to make use of PX-meters which are equipped with or without clock cables in the event of the reader being provided with one emitter and two receivers.

The LX-terminal is able to distinguish the difference between PX-meters with or without clock cables. The LX-terminal is then capable of adapting its programming to suit the type of meter concerned.

The attempt at communication may be repeated a number of times if it not approved by the PX.

6 LX-TERMINAL

Although the LX-terminal does not directly form part of the present invention, certain of its functions will nevertheless be described in greater detail, since the LX-terminal does in fact form part of a complete operating system.

The interface between the PX-meter and the LX-terminal may be either of a previously disclosed design or of entirely new design, although it must be capable of exchanging information between the two units.

PAYMENT AND ACCOUNTING FUNCTION (LX-TERMINAL)

6.1 Description of the functions of the LX-terminal and of its general areas of application The part played by the LX-terminal in the PX-system is as an independently operating terminal with the following main functions:
- (a) The collection of accounting data relating to the use of PX and the storage of those data (reading of the PX-meter);
- (b) Recording and copying of accounting data relating to PX-markers issued via the LX-terminal;
- (c) Transfer of data stored in the LX-terminal to a common accounting system (the RX-system);
- (d) Checking that the PX-meter which is read in the LX-terminal meets the requirements laid down for PX-meters;
- (e) Accounting for the sale of PX-markers recorded in the LX-terminal to the LX-operator.

The data transactions which are stored in the LX-terminal occur mainly as part of the relationship between the LX-terminal and the PX-meter (accounting, filling and wrong transactions). In certain cases, however, it is possible for transactions to be generated by the entry of data via the keyboard of the LX-terminal.

The specific function of the LX-terminal which distinguishes it from other data collection terminals is the fact that the overwhelming majority of its transactions are generated by reading-out data from or by entering data into a PX-meter.

Thus the reading function used in the relationship between the LX-terminal and the PX-meter is of critical significance to both the function of the LX-terminal and the function of the entire system. The unit within the LX-terminal which is used when reading the PX-meter may also be used in other applications, for which reason this particular part of the LX is subject to specific design requirements.

The transactions which are generated by the LX and which are stored in it are by their very nature original verifications within an accounting system or else cash register items within a cash sales system. This means that the storage of data in the LX must be so arranged that these transactions may be neither destroyed nor tampered with—either intentionally or unintentionally.

The transactions which are stored in the LX must be transferred to a central, computer-based accounting system, known as the RX-system. This transfer is designed to be made via the telephone system after the LX-terminal has been called automatically by the RX-system. The RX-system will then add together and direct to the respective principals the transactions which have been collected by the LX-terminal.

Since the LX-terminal in the PX-system is used as accounting aid in the system whereby PX-markers are sold, partly in return for cash payment and partly against credit cards or by the direct debiting of a bank account or similar, the LX-terminal in the PX-system tends to be used by preference in areas where some other form of cash business is being operated at the same time. In the majority of cases this cash business will have access to its own individual cash register, which may thus be used in conjunction with the function of the LX-terminal. The following are conceivable locations for the LX-terminal in the PX-system:
- (a) petrol stations;
- (b) newspaper kiosks run by the "Pressbyrån" company;
- (c) possibly in certain post offices and bank branches;
- (d) special locations administered by the principals of the parking facilities.

6.2 Principal data and structure of the system 6.2.1 Introduction

Details are provided in this section of the basic requirements in respect of the capacity and function of the LX-terminal. These requirements may be divided up into the following main areas:

Data storage;
Communication with RX;
Staff and customer service;
Programme functions and programme capacity;
System components;
Requirements in respect of the dimensions and weight of the system components;
Operating time and back-up.

6.2.2 Data storage

Transaction types/register in the LX-terminal and the extent of their characters on transmission or reception to or from RX may be accounted for in a detailed specification of the requirements relating to the LX-terminal.

Generally speaking, the LX-terminal shall be capable of meeting the following requirements in respect of simultaneous data storage:

| Transaction/ register | Number of characters | Data storage in LX-terminal | | Desired number of items (design requirement) |
| --- | --- | --- | --- | --- |
| | | Required number of items; min. | Total number of characters | |
| PX-transaction | 180 | 50 | 9000 | 100 |
| Permit transaction | 40 | 10 | 400 | 30 |
| Manual error transactions | 60 | 5 | 300 | = |
| Transaction granting permission (Permit programme register) | 50 | 40 | 2000* | = |
| Opening transaction | 500 | 1 | 500 | |

| Transaction/ register | Number of characters | Data storage in LX-terminal Required number of items; min. | Total number of characters | Desired number of items (design requirement) |
| --- | --- | --- | --- | --- |
| Blocking register Reserve | 7 | 50 | 350 | 100 |
| Total for data memory | | | 12 500 approximately | |

*The extent of the memory should be capable of being allocated flexibly either to the PX-transactions in accordance with the stipulated requirements, or to the granting of permission. This means that certain LXs may have the characteristics of "permission programming terminals", whereas others may have the characteristics of PX-entry terminals.

6.2.3 Communication with RX

Communication between RX and LX may take place via the telephone system.

The maximum number of characters which may be transferred from LX to RX on any one occasion shall be approximately 10 000.

The maximum number of characters which may be transferred from RX to LX on any one occasion shall be approximately 3 000.

The transmission time for each LX-RX communication with full data transfer shall be less than 10 minutes, and should preferably be less than 5 minutes.

6.2.4 Staff and customer service

The normal PX/LX transaction is a combination of markers being replenished and consumption being accounted for.

The transaction time for a transaction of this kind, defined as the period between the operator being handed the PX-meter by the customer and the customer being handed back the PX, shall be less than 15 seconds and preferably less than 10 seconds.

6.2.5 Programme functions and programme capacity

The programme functions of the LX-terminal may be appreciated from the following list of functions:

1. Input and storage of PX accounting data from the PX-meter;
2. Generation and recording of replenishment transactions and storage of these;
3. Checking of the technical function of the PX-meter, any faulty PXs being taken out of use;
4. Checking of functional status in respect of the main memory, condition, battery, and implementation of any necessary measures;
5. Reading of the contents of the memory of the PX-meter as far as concerns status and condition, and presentation of these data to the customer on a suitable display. In this way the customer will be able to see why the PX is not working and will be able to note down the identity number of a new PX;
6. Programming of the permit of the PX-meter in accordance with a standard procedure based on a permit document;
7. Reprogramming of the charge memory and time memory of the PX-meter on instructions being received from the central accounting system;
8. Blocking function for certain PX-meters which have been declared unserviceable, and of which the identity numbers (internal) have been transferred to LX from RX;
9. Clock and time recorder with a capacity $\geq$ 1 month (to be synchronised at least once per month);
10. Transfer of PX-transactions to RX via the telephone system;
11. Accounting function for the operator/point of sale, which operates independently of the RX system and of the reading/replenishment of PX;
12. Accounting procedure for close of business each day in communication with RX;
13. Start procedure for LX in communication with RX, in which LX is allowed to operate for a certain period and with a targeted total sales/transaction volume;
14. Transfer of special data and instructions from RX to LX (blocking of PX, variation of charges, opportunities for condition programming).

6.2.6 Components of the LX-system

The LX-terminal represents a terminal computer system with a number of physically separate functional components. The system shall include the following component parts:

A Operator's station
1. 10-position keyboard with correction facility;
2. Function keyboard;
3. PX-reader;
4. Operator's display;
5. Non-zeroing counter, partly for the number of transactions (PX read in LX) and partly for the total number of markers added.

B Client display

C Communication
1. Modem;
2. Telephone apparatus.

D Power supply
(1) DC/DC converter;
(2) Battery;
(3) Battery charger.

6.2.7 Requirements relating to the dimensions and weight of the component parts of the LX-system The operator's station is in the form of a table unit. This should occupy a maximum surface area of $300 \times 200$ mm$^2$.

The height should be $\leq 150$ mm.

The unit shall be designed in such a way that the operator's display is clearly visible to the operator, both in the normal operating position and from a distance of approximately 1.5 m from the operator's station. Furthermore, the keys must be capable of being operated comfortably.

6.2.8 Operating time and back-up

In the event of mains failure, the operating time shall be at least 30 hours.

The incorporation of a personal code in every transaction provides the advantage that every transaction is authorised and accounted for.

The transaction becomes personalised in this way, and the desired high degree of integrity is maintained.

This should reduce the risk of hold-ups and the risk of theft.

In addition to transactions between the LX-terminal and the PX-meter, it is also possible to imagine a transaction, based on similar identification conditions, between PX-meters or between a PX-meter and a terminal in a commercial firm or similar location.

We claim:

1. A method for recording financial transactions in a cash-less payment system having a portable device, which includes a main memory and plural accounting memories, and a terminal by which information relating to financial transactions is transferred into at least one of the memories in the portable device, comprising the steps of:

upon the payment of a fee, loading the main memory of the portable device, via the terminal, with units of information corresponding to the amount of the fee;

upon the occurrance of a financial transaction, allocating a number of information units, corresponding to the amount of the transaction, that are stored in the main memory to an accounting memory assigned to the creditor with whom the transaction is made; and reading the contents of the accounting memories, via the terminal, and providing an indication of the creditors with whom transactions were carried out and the respective amounts of the transactions.

2. The method claim 1 wherein each of the units of information stored in the main memory has an identical value.

3. The method of claim 1 wherein the allocation of information units to an accounting memory comprises transferring the information bits from the main memory to a separate accounting memory.

4. The method of claim 1 wherein the allocation of information units comprises assigning a predetermined address marker to the information units in the main memory.

5. The method of claim 1 wherein the allocation of information units is effected by actuating a keyboard on the portable device at the time of the transaction.

6. The method of claim 1 wherein the allocation of information units is effected by actuating a keyboard on the portable device prior to the transaction to enter a predetermined code which causes the allocation to be automatically made at the time of the transaction.

7. The method of claim 6 wherein the code is displayed on the portable device when the keyboard is actuated.

* * * * *